United States Patent Office 2,885,910
Patented May 12, 1959

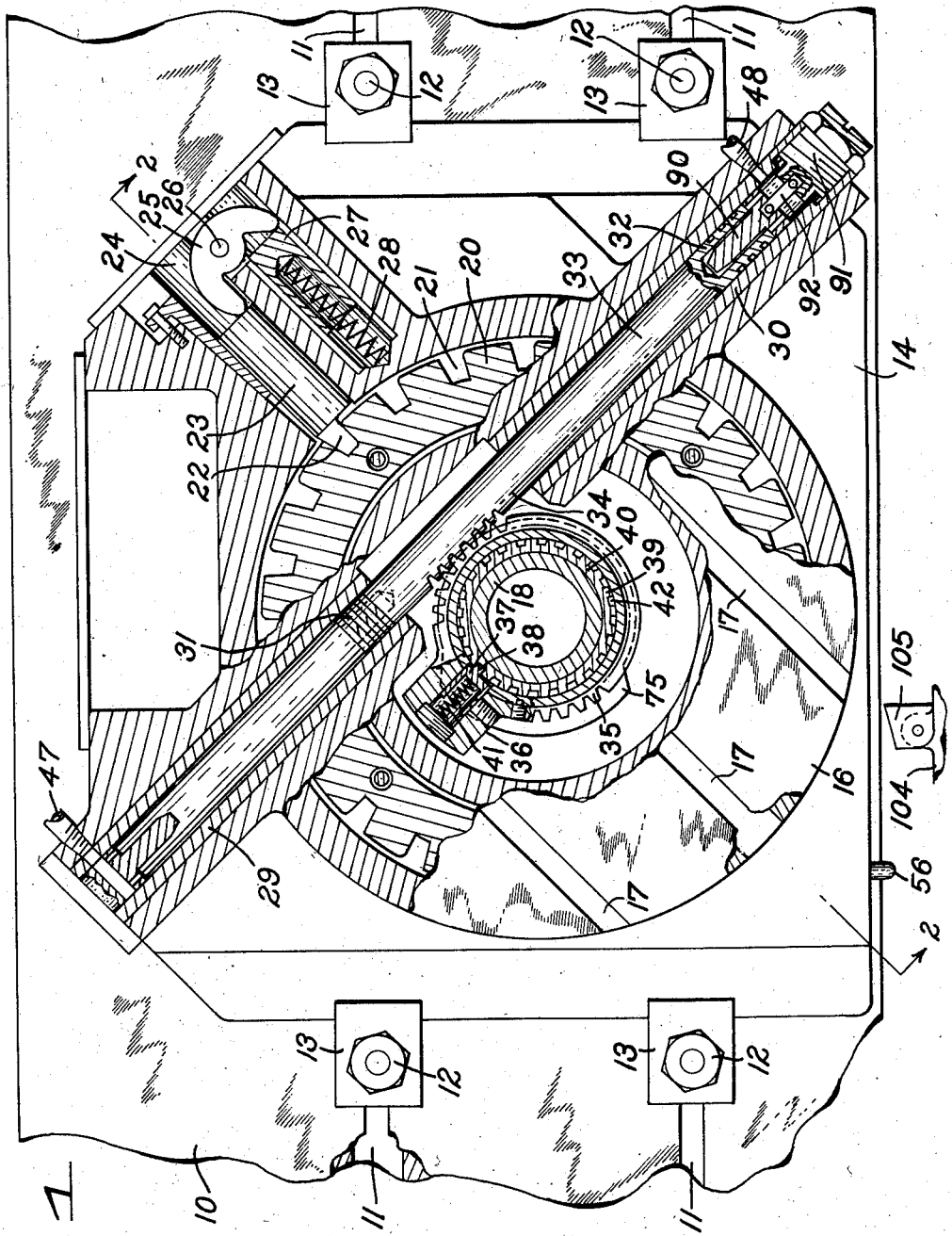

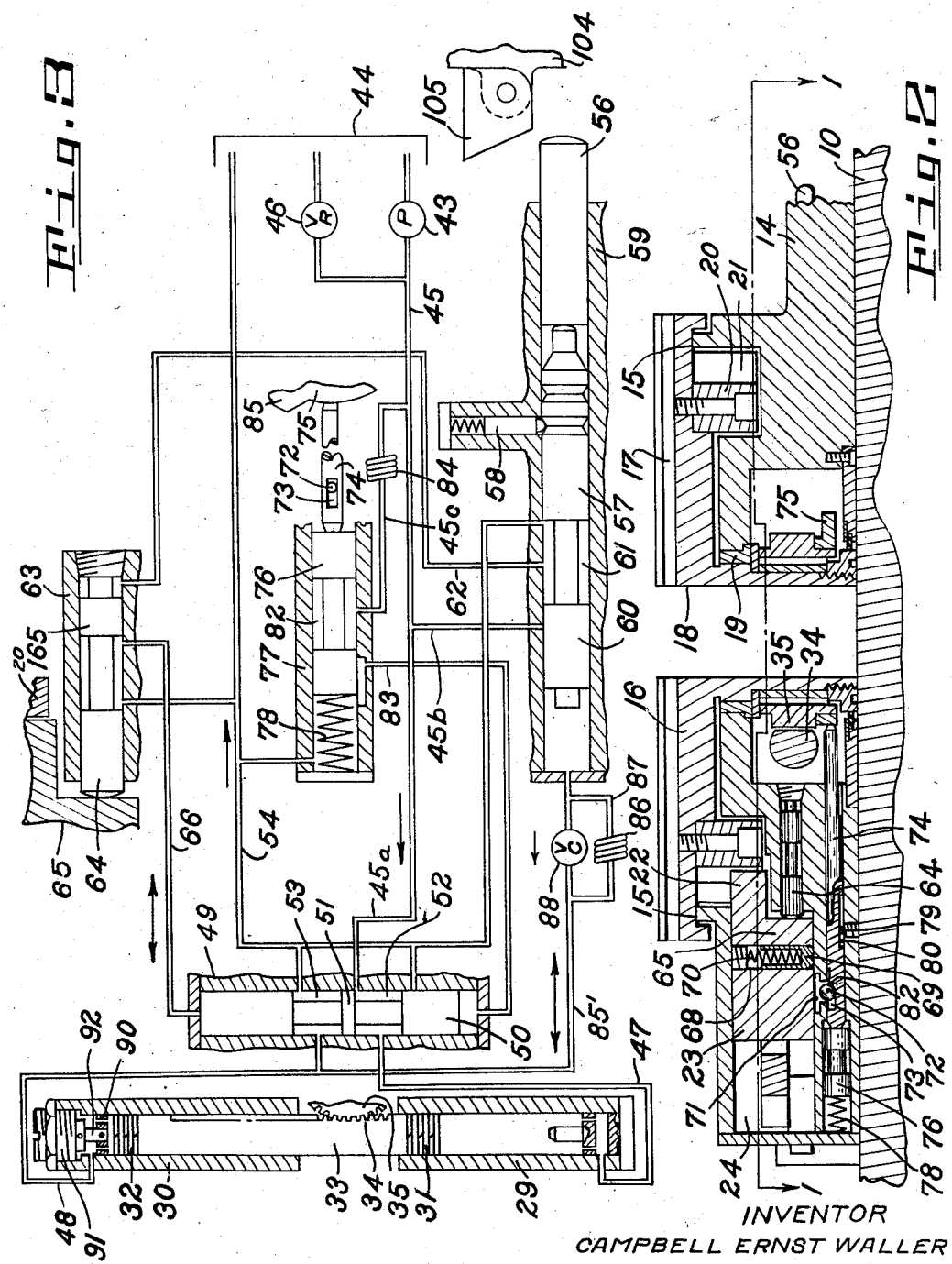

2,885,910

AUTOMATIC INDEXING MECHANISM

Campbell Ernst Waller, Cincinnati, Ohio, assignor to The Cincinnati Milling Machine Co., Cincinnati, Ohio, a corporation of Ohio Application November 23, 1954, Serial No. 470,614

8 Claims. (Cl. 74—817)

This invention relates to improvements in machine tool structures and has particular reference to an improved form of index base and control mechanism therefor.

One of the objects of the present invention is the provision of a novel and improved index base structure, particularly adapted for use in connection with milling machines or similar machine tools.

A further object of the invention is the provision of an improved automatically controllable rapidly operating index base structure.

An additional object of the invention is the provision of an improved combination and arrangement of hydraulic controls for effecting rapid and accurate indexing of a work holding base or fixture, together with means for accurately and positively locking the same in desired sequentially indexed positions.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 is a view partially in elevation and partially in section of a mechanism embodying the present invention.

Figure 2 is a vertically sectional view on the line 2—2 of Figure 1, and

Figure 3 is a diagrammatic view illustrating the hydraulic and associate control means for index base operation.

In the drawings the numeral 10 designates the reciprocating table of a milling machine or like machine tool having the T slots 11 receiving the bolts 12, which through clamp plates 13 secure in position on the table, the base 14 of the improved index base. Supported on the bearing portions 15 of the base 14 is the rotatably adjustable work supporting table portion 16 of the index base having T slots 17 facilitating clamping work pieces in position on said table section. The table section is provided with a hub 18 journaled in the bushing 19 of the base 14.

Bolted to the underside of the table 16 is the index ring or plate 20 having a series of peripherally spaced notches 21 for engagement by the locking pin 22. This locking pin has a body portion 23 axially slidable in the guide bore 24 formed in the base 14. An arcuate pressure lever 25 intermediately pivoted to base 14 at 26 has one end engaging the outer end of the member 23 and the other end reacted on by plunger 27 outwardly urged by spring 28. The reaction of the spring on the lever 25 is such as to force the pin 22 selectively into engagement with the notches 21 of the index ring 20 as is particularly illustrated in Figure 1.

For effecting indexing of the table 16, there is secured in the base 14 the aligned cylinders 29 and 30 receiving the piston portions 31 and 32 on opposite ends of the rack bar 33 which has the central rack portion 34. This rack portion meshes with the circular rack 35 rotatably supported by the base 14 in coaxial relation to the hub 18. The rack 35 carries a housing 36 for the spring pressed indexing plunger 37 having a pawl portion 38 urged into engagement with the teeth 39 of the ratchet 40 by spring 41. This ratchet is secured on the hub 18 of the table 16.

As is conventional in structures of this character, the pawl 38 is formed at one side with a straight surface interfitting with one side of the several teeth 39 and beveled at the opposite side to be cammed outwardly and ride reversely over the ratchet when the housing 36 is rocked in an opposite or, as viewed in Figure 1, a clockwise direction.

By reference to Figure 1, it will be evident that when the shifter rod or rack bar 33 is moved to a lower or right hand position as viewed in Figure 1 that the index ring 35 and associate parts will have been given a clockwise movement, coming to rest with the pawl 38 engaged in one of the notches 42 between adjacent teeth 39, the parts then being in position for initiation of an indexing operation. Upward movement in a left hand direction of the rack bar 33 as viewed in Figure 1 will cause a counterclockwise movement of the ring 35 and associate parts and a corresponding indexing of the table 16.

The automatic control of operation of these parts will be best understood by reference to Figure 3. It is intended that the operation of the index table mechanism shall be automatically, hydraulically effected, use being made of hydraulic pressure pump 43, discharging hydraulic medium from the reservoir 44 into the pressure conduit system 45 at a pressure determined by the conventional relief valve 46.

Coupled with the outer ends of the cylinders 29 and 30 are the pressure conduits 47 and 48 extending to the containing bushing 49 for the hydraulically operable reversing valve 50. Centrally ported into this bushing is branch 45a of the pressure conduit system selectively couplable with conduit 47 or 48 depending on the position of the central spool 51 of valve 50. As illustrated, conduit 47 is connected through valve groove 52 with the pressure conduit 45a while the conduit 48 is connected through valve groove 53 with the low pressure or reservoir connection conduit 54, the rod 33 occupying a right hand position as previously described in connection with Figure 1 and being ready for an indexing operation. For effecting automatic indexing, the bed or support 104 for the machine tool table 10 is provided with the pivoted dog 105 for engagement with the plunger portion 56 of the valve mechanism indicated at 57. When the table 10 is moving to the right as viewed in Figure 1, dog 105 will engage and depress or inwardly move plunger 56 which is normally held in extended position by the latch 58. Branch 45b of the pressure conduit is coupled to the containing bushing 59 and is normally blocked by the piston spool portion 60 of the valve structure 57. However, when plunger 56 is depressed, groove 61 will connect conduit 45b with conduit 62 extending into the lower end of the plunger bushing 63, moving the plunger 64 to the left as viewed in Figure 3. This plunger reacts against shoulder 65 on the index base locking pin 23, moving the pin outwardly as viewed in Figure 1 to disengage the index locking ring 20. This movement is sufficient to shift spool 165 on the plunger beyond the point of connection of conduit 66 into the bushing 63 so that conduit 62, now containing actuating medium under pressure is coupled with conduit 66, which reacts against the reversing valve 50 shifting the valve downward. This movement of the valve couples conduit 47 by way of groove 52 with the reservoir conduit 54 while connecting the direct pressure conduit 45a with conduit 48 so that the pump pressure will react to move 33 to the left as viewed in Figure 1. This will actuate the pawl and ratchet mechanism 38—40 previously described in a counterclockwise direction, imparting instantly responsive counterclockwise movement to the index table. The member 23 is provided with a socket 68 receiving the detent or locking pin 69 urged downwardly as viewed in Figure 2 by a spring 70. The base 14 is provided with a socket 71 into which the locking pin 69 snaps when the index lock pin 23 has been shifted by plunger 64 out of the position shown in Figure 1 to a position of clearance sufficient to permit free rotation of the index plate 20. The socket 71 is preferably larger than the pin 69, permitting limited movement of the locking pin after it is retained in retracted position. Depending on the relative dimensioning of the parts, the index base locking pin may be held entirely clear of the index plate 20, or permitted to ride slightly on the periphery of the plate 20 as it turns ready to slide into the proper notch 21 when the pin 69 is released. Disposed at the base of the socket 71 is the release ball 72 normally partially projecting or depending into the groove 73 of plunger 74. This plunger rides at one end against the cam 75 carried by the oscillating rack 35 and engages at its opposite end the reverse control valve 76. Valve 76 is mounted in the bushing 77 and is maintained in engagement with the plunger 74 by the spring 78. A key or stud 79 engaged in groove 80 permits longitudinal sliding movement of the plunger while maintaining the groove 73 aligned with the ball 72. The cam or eccentric portion of the member 75 is preferably so located as to be brought into engagement with and outwardly shift the plunger against the pressure of the member 78 when the rack bar 33 is at its extreme position for effecting counterclockwise indexing of the table 16 so that the table 16 will be moved substantially to maximum indexing position prior to effective engagement of the rise 85 of member 75 with the plunger 74. Upon movement of the plunger, the beveled shoulder 82 of slot 73 will cam the ball 72 in an upward direction, pushing the locking pin out of socket 71. At the same time outward movement of the valve 76 will couple pressure conduit branch 45c by way of groove 82 with the pilot conduit 83 rendering pilot pressure effective at the opposite end of the valve 50 from that on which the previously effective pilot pressure in conduit 66 reacted, tending to fire the valve 50 upwardly as viewed in Figure 3. This movement of the valve will couple conduit 48 by way of groove 53 to reservoir conduit 54 and introduce pressure from 45a by way of groove 52 and conduit 47 to reverse the position of rack bar 33. During this movement the pawl carrier 36 will be idly shifted in a clockwise direction, the pawl 38 riding over the index teeth 39. The rate of actuation of the reversing valve 50 is determined by the choke or resistance coil 84 into the conduit 45c.

As has been pointed out, automatic indexing is the result of interengagement of the pivoted dog 105 with the valve plunger 56. This engagement served temporarily to move the plunger 56 inwardly or to the left as viewed in Figure 3. Continued travel of the table in a right hand direction, however, will cause disengagement of the plunger 56 with respect to the dog 105 while shifting of the valve 50 to couple pressure from 45a to conduit 48 will also introduce pressure into the conduit 85', and by way of the delay or resistance coil 86 to conduit 87 communicating with the closed end of bushing 59 containing the valve spool 60 of valve 57 operable by movement of plunger 56. This pressure will then react on the piston spool 60 of the valve restoring the valve to the position shown in Figure 3 in which the conduit 62 is connected by way of the groove 61 to the reservoir conduit 54. As this takes place subsequent to the securing of the index locking pin 23 in retracted position by the locking pin 69, the index locking pin is held in said retracted position but the hydraulic pressure is relieved, permitting the pin to snap into locking engagement with the index plate 20 when releasing movement of the ball 72 is effected. To couple conduit 85' with reservoir conduit 54, relieving the pressure against spool 60, the one way effective check valve 88 permits free exhaust or expulsion of any contained hydraulic medium in the left hand end of bushing 59 and permits free dog effected movement of the plunger 56 and valve 57. The check valve 88, however, is effective to prevent free pressure flow from conduit 85' into the bushing for reaction against piston 60 for power movement of the piston, the rate of this flow being controlled by the resistance 86.

During performance of a milling operation the workpiece is clamped on the rotatable table 16 which is locked in selected position, and the milling machine table 10 reciprocated to feed work with respect to the milling cutter. At this time the indexing mechanism is in what may be termed a ready or loaded position in that the rack bar 33 is shifted to the right and the indexing pawl 38 is engaged with a selected notch 42 ready for immediate indexing or rotating of the table a selected amount when a proper control signal is given. This signal is given by engagement of the plunger 56 with a dog 105.

As the plunger is moved inwardly by the dog the hydraulic pressure conduit system is coupled by the valve groove 61 to conduit 62 to shift the index locking pin operating plunger 64, retracting the locking pin 23 out of engagement with the index ring. Continued movement of plunger 64 subsequent to release of the locking plunger couples the hydraulic pressure circuit 45b—62 with a pilot conduit 66 reacting on the reversing valve 50. Movement of the reversing valve provides a direct connection of the source of hydraulic medium 45a with conduit 48 reacting against the indexing rack bar 33 causing immediate arcuate movement of the pawl 38 to the full permissible limit of stroke of the member 33. The pawl carries with it the rotary work supporting table 16. As the pawl approaches its limit of stroke, shoulder 85 on cam 75 trips or actuates plunger 74, and ball 72 is cammed outwardly by the plunger to release detent or locking pin 69, permitting the index locking plunger 23 to snap into the proper recess 21 of the index plate, locking the plate and thus the table against further movement. Continued movement of plunger 74 shifts valve 76 to connect the hydraulic actuating circuit 45c through 83 with the reversing valve 50 to move the valve in the opposite direction causing a retraction or resetting movement of the rack bearing rod or reciprocating piston 33, so that the parts are returned or reset in position for a subsequent indexing movement.

In view of the nature of the novel controls and index base operation above described, it is desirable that irrespective of the degree of indexing or advance to be imparted to the work supporting table, the pawl 38 and associate parts have in all instances a definite terminal position and that any variance in the stroke of the member 33 be controlled as respects its return movement. To this end, use may be made of a suitable adjustable stop mechanism. In the present instance, this has been indicated as an adjustable cylinder end or abutment 90 slidably mounted within the cylinder 30.

Suitable threaded or other adjusting means may be employed variably to secure the abutment in adjusted position according to the limit of return stroke desired. As illustrated, the cylinder head 91 is threaded into the cylinder 30, and a removable spacer rod 92 is interposed between the abutment 90 and the head 91. Use of different lengths of spacer rods 92 take care of major positional adjustments.

What is claimed is:

1. An index base for machine tools, comprising a base, a table rotatably mounted on the base, mechanism for rotatably indexing the table on the base including a pawl and a ratchet, a hydraulic actuator for moving the pawl of said mechanism, a locking member carried by the base for securing the table against rotation, and means for controlling the operation of said index base including a hydraulic actuating circuit, a trip operable plunger, a valve in the circuit actuable by the plunger, a locking member release plunger for moving the locking member into retracted position in said circuit, said release plunger being hydraulically connected with the trip plunger valve for shifting upon movement of the valve, the hydraulic actuating circuit including a reversing valve, conduits coupling the actuator with the reversing valve, a branch circuit for controlling movement of the reversing valve, valve means on the release plunger effective when the plunger is in locking member releasing position to connect said hydraulic actuating and branch circuits, and means to reposition the trip operable valve plunger, said means including a reversing valve controlled hydraulic circuit.

2. An index base for machine tools, comprising a base, a table rotatably mounted on the base, mechanism for rotatably indexing the table on the base including a pawl and a ratchet, a hydraulic actuator for moving the pawl of said mechanism, a locking member carried by the base for securing the table against rotation, and means for controlling the operation of said index base including a hydraulic actuating circuit, a trip operable plunger, a valve in the circuit actuable by the plunger, a locking member release plunger for moving the locking member into retracted position in said circuit, said release plunger being hydraulically connected with the trip plunger valve for shifting upon movement of the valve, release plunger operated valve means effective when the plunger is in locking member releasing position to complete a hydraulic control circuit for effecting operation of the said actuator for the pawl, and a detent for securing the locking member in retracted position.

3. An index base for machine tools, comprising a base, a table rotatably mounted on the base, mechanism for rotatably indexing the table on the base including a pawl and a ratchet, a hydraulic actuator for moving the pawl of said mechanism, a locking member carried by the base for securing the table against rotation, and means for controlling the operation of said index base including a hydraulic actuating circuit, a trip operable plunger, a valve in the circuit actuable by the plunger, a locking member release plunger for moving the locking member into retracted position in said circuit, said release plunger being hydraulically connected with the trip plunger valve for shifting upon movement of the valve, release plunger operated valve means effective when the plunger is in locking member releasing position to complete a hydraulic control circuit for effecting operation of the said actuator for the pawl, a detent for securing the locking member in retracted position, and means operable by the pawl moving actuator for releasing said detent.

4. An index base for machine tools, comprising a base, a table rotatably mounted on the base, mechanism for rotatably indexing the table on the base including a pawl and a ratchet, a hydraulic actuator for moving the pawl of said mechanism, a locking member carried by the base for securing the table against rotation, and means for controlling the operation of said index base including a hydraulic actuating circuit, a trip operable plunger, a valve in a circuit actuable by the plunger, a locking member release plunger for moving the locking member into retracted position in said circuit, said release plunger being hydraulically connected with the trip plunger valve for shifting upon movement of the valve, release plunger operated valve means effective when the plunger is in locking member releasing position to complete a hydraulic control circuit for effecting operation of the said actuator for the pawl, a detent for securing the locking member in retracted position, a reset controlling plunger, a trip for said reset plunger movable with the pawl, and means on the reset plunger effective on movement of the plunger to release the detent.

5. An index base for machine tools, comprising a base, a table rotatably mounted on the base, mechanism for rotatably indexing the table on the base including a pawl and a ratchet, a hydraulic actuator for moving the pawl of said mechanism, a locking member carried by the base for securing the table against rotation, and means for controlling the operation of said index base including a hydraulic actuating circuit, a trip operable plunger, a valve in the circuit actuable by the plunger, a locking member release plunger for moving the locking member into retracted position in said circuit, said release plunger being hydraulically connected with the trip plunger valve for shifting upon movement of the valve, release plunger operated valve means effective when the plunger is in locking member releasing position to complete a hydraulic control circuit for effecting operation of the said actuator for the pawl said control circuit including a reversing valve, a detent for securing the locking member in retracted position, a reset controlling plunger, a trip for said reset plunger movable with the pawl, means on the reset plunger effective on movement of the reset plunger to release the detent, a branch circuit for effecting movement of the reversing valve, and valve means shiftable by said reset plunger movement to couple said branch circuit with the hydraulic actuating circuit for operation of the reversing valve.

6. An index base for machine tools comprising a base member, a table rotatably mounted on the base member, a locking plunger carried by the base member and extendable for securing the table against rotation, means mounted on the base for indexing the table including a hydraulically oscillatable ratcheting mechanism, a reverse valve hydraulically connected to said mechanism and operable when shifted to reverse the same, a starting valve having an extendable trip operable plunger, a detent for holding said starting valve plunger in a depressed position upon trip operation thereof, hydraulic means connectible by the valve plunger to effect retraction of said locking plunger, a detent for holding the locking plunger in a retracted position during indexing, hydraulic means operable on retraction of said locking plunger to shift said reverse valve, hydraulic means responsive to said shifting of the reverse valve to extend said starting valve plunger, and means cam operated during indexing to oppositely shift the reverse valve and release the locking plunger detent.

7. An index base comprising a base member, a table rotatably mounted on said base member, a movable lock engaged with the table when in a locking position for holding the table against rotation, an oscillatable indexing means operable on movement in one direction to rotate the table, a first control plunger, means responsive to movement of said first control plunger from an initial position to move said lock from its locking position, means to hold the lock from its locking position, control means operable in response to movement of the lock from its locking position to move said indexing means in said one direction for rotation of the table, means responsive to the operation of said control means to return the first control plunger to its initial position, a second plunger, trip means movable with the indexing means for shifting said second plunger, and means responsive to the shifting of the second plunger to release said lock holding means and return the indexing means.

8. An index base comprising a base member, a table rotatably mounted on said base member, a movable lock engaged with the table when in a locking position for holding the table against rotation, an oscillatable indexing means operable on movement in one direction to rotate the table, an adjustable stop variable to limit said movement of the indexing means, a first control plunger, means responsive to movement of said first control plunger from an initial position to move said lock from its locking position, means to hold the lock from its locking position, control means operable in response to movement of the lock from its locking position to move said indexing means in said one direction for rotation of the table, means responsive to the operation of said control means to return the first control plunger to its initial position, a second plunger, trip means movable with the indexing means for shifting said second plunger, and means responsive to the shifting of the second plunger to release said lock holding means and return the indexing means.

References Cited in the file of this patent

UNITED STATES PATENTS

| | | |
|---|---|---|
| 728,573 | Hanson | May 19, 1903 |
| 1,745,460 | Sudhoff | Feb. 4, 1930 |
| 2,407,970 | Andrew et al. | Sept. 24, 1946 |
| 2,453,600 | Soden | Nov. 9, 1948 |
| 2,464,996 | Schafer et al. | Mar. 22, 1949 |
| 2,672,773 | Schofield | Mar. 23, 1954 |
| 2,770,984 | Loecy Jr. | Nov. 20, 1956 |